United States Patent [19]

Garret et al.

[11] Patent Number: 5,167,428
[45] Date of Patent: Dec. 1, 1992

[54] POSITION-ADJUSTMENT DEVICE FOR A BELT-GUIDE, AND SAFETY-BELT PROVIDED THEREWITH

[75] Inventors: Gilles Garret; Claude Aubry, both of Gournay-En-Bray, France

[73] Assignee: General Engineering (Netherlands) BV, Utrecht, Netherlands

[21] Appl. No.: 735,148

[22] Filed: Jul. 15, 1991

[30] Foreign Application Priority Data

Jul. 13, 1990 [FR] France .................... 90 08945

[51] Int. Cl.$^5$ .................................... B60R 22/20
[52] U.S. Cl. ........................... 280/808; 248/297.3
[58] Field of Search ............... 280/801, 808; 297/468, 297/483; 248/297.3

[56] References Cited

U.S. PATENT DOCUMENTS

| | | | |
|---|---|---|---|
| 4,564,219 | 1/1986 | Baden et al. | 280/808 |
| 4,818,023 | 4/1989 | Griesemer | 297/483 |
| 4,834,427 | 5/1989 | Takada | 297/483 |
| 4,917,403 | 4/1990 | Gyoda | 280/808 |

FOREIGN PATENT DOCUMENTS 0376320 7/1990 European Pat. Off. .
3151019 7/1983 Fed. Rep. of Germany .

*Primary Examiner*—Karin L. Tyson
*Attorney, Agent, or Firm*—Young & Thompson

[57] ABSTRACT

A position-adjusting device for a safety belt guide loop includes a rail provided with retaining slots, a carriage which is slidably mounted on the rail and on which are mounted the guide loop and two locking bolts urged by respective springs to a position of engagement in the rail slots in order to lock the carriage in a corresponding position along the rail. The length of the rail slots in the direction of sliding motion of the carriage is greater than the corresponding dimension of the locking bolts. The bolts are so arranged in relation to each other that, in any position of the carriage along the rail, at least one locking bolt is located opposite to one rail slot and capable of engaging therein. The slots form a single row and are each capable of receiving both locking bolts, depending on the position of the carriage along the rail.

9 Claims, 2 Drawing Sheets

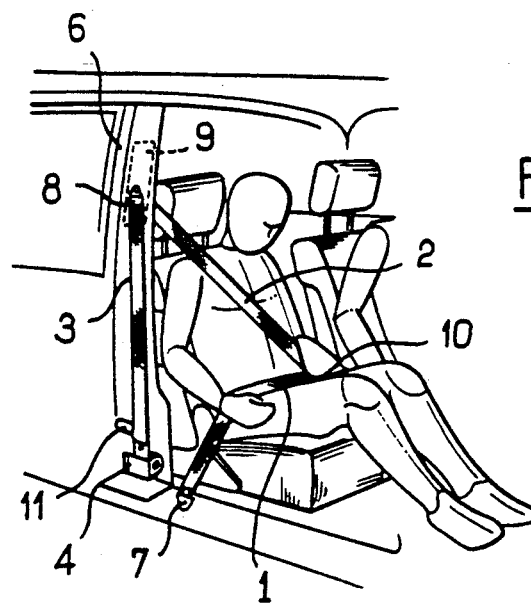
FIG.1
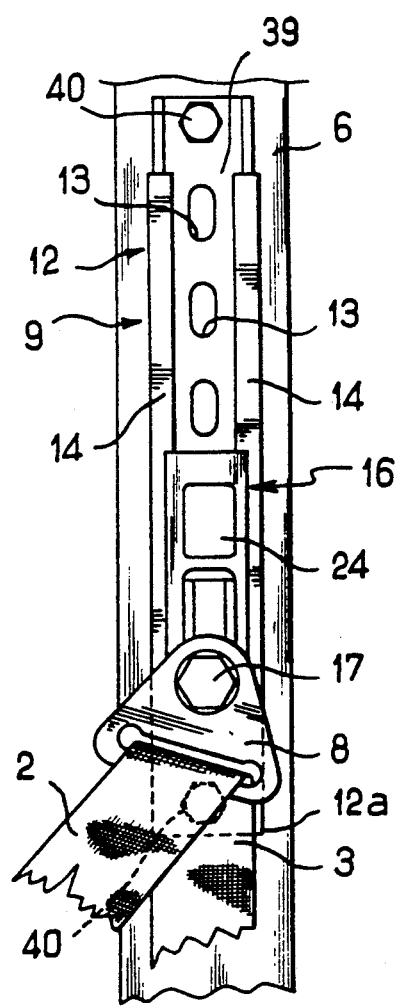
FIG_2

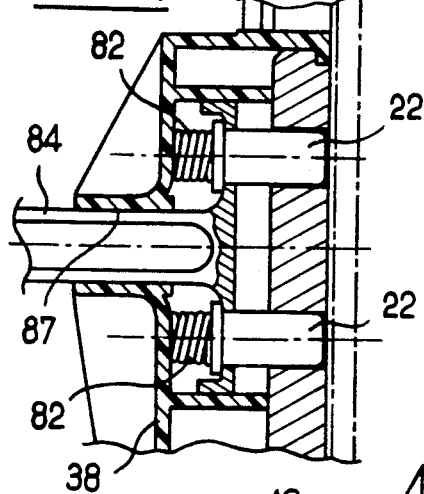
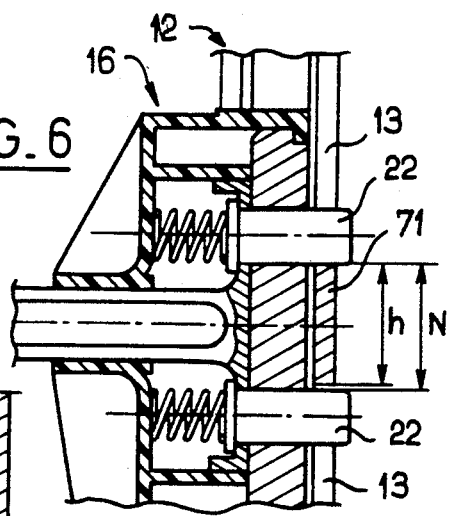
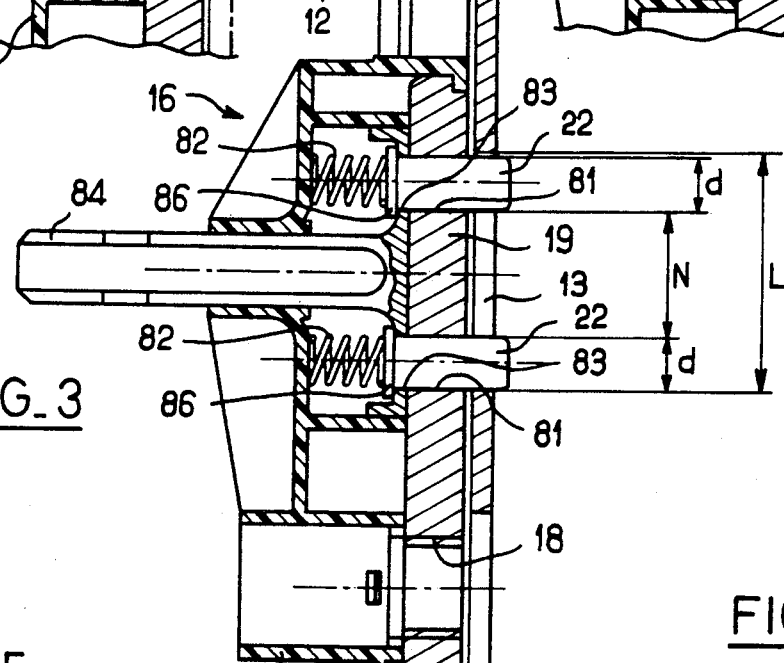
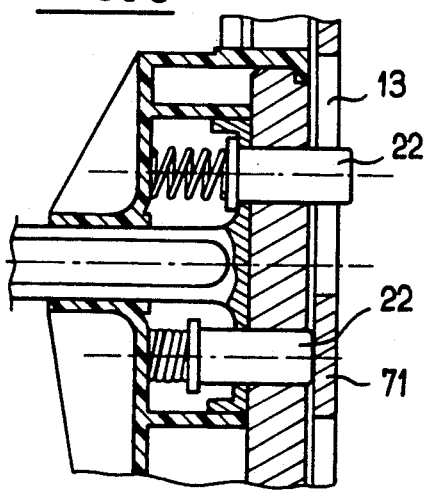
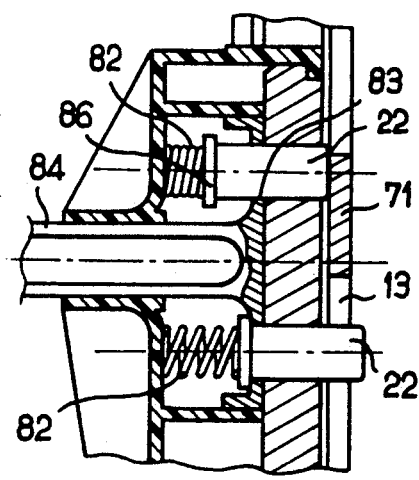

POSITION-ADJUSTMENT DEVICE FOR A BELT-GUIDE, AND SAFETY-BELT PROVIDED THEREWITH

FIELD OF THE INVENTION

The present invention relates to a position-adjusting device for the guide loop of a safety belt of the type employed in automobiles.

This invention is specifically concerned with the height adjustment of the pillar guide-loop in which the safety belt slides between its substantially vertical portion which extends from the inertia reel and its oblique portion which constitutes the shoulder-belt.

The invention is also concerned with a safety belt equipped with an adjusting device of this type.

BACKGROUND OF THE INVENTION

It is a known practice to adjust the height of the safety belt guide loop so as to ensure that the position of the shoulder-belt portion is adapted to the stature of the user who occupies the corresponding seat.

There is known in particular a device having a guide loop secured to a carriage which is capable of displacement along a substantially vertical rail provided with retaining slots. A locking bolt mounted on the carriage engages in one of the rail slots under the action of a restoring spring.

This adjusting device may present certain hazards if the user has failed to ensure that the carriage is correctly located in a position in which the bolt can engage freely in one of the slots under the action of its restoring spring. Should this not be the case, the carriage is liable to travel very rapidly along the rail in the event of a violent tractive force applied to the safety belt and especially in the event of impact. During this very rapid displacement, the locking bolt is liable to pass over each slot without having time to engage therein, with the result that the travel of the carriage will end only when reaching the limit stop at the lower end of the rail. This corresponds to a considerable increase in length of the two useful portions of the safety belt after locking of the inertia reel. The user is then in serious danger.

This disadvantage becomes still worse in the event that the inertia reel is equipped with a so-called "pretensioning" device. As is already known, a device of this type is started in the event of impact and re-tightens the safety belt. Thus the slack which has developed between the safety belt and the user's body as a result of the limited retraction force of the inertia reel is eliminated before the deceleration caused by an impact becomes fully effective. In consequence, the seat occupant's body is placed in a more favorable position for the remainder of the deceleration. When the pretensioning device is mounted in the vicinity of the inertia reel, it has the effect of applying a downward tractive force on the safety-belt portion which extends from the reel and this tractive force is retransmitted to the safety belt guide loop and consequently to the carriage which supports the guide loop. The force produced by the pretensioning device is therefore directed exactly in the direction in which the carriage slides along the rail in the event that it has been left between two locking positions. In another known arrangement, the pretensioning device is associated with the safety-belt buckle. In this case also, a force having a downwardly directed component is applied by the pretensioning device to the safety belt guide loop via the shoulder-belt portion when the pretensioning device is started. The acceleration of the carriage due to this pretensioning system is thus of considerable magnitude, thereby increasing the danger of its reaching the lower limit stop without any intermediate locking as mentioned earlier.

As disclosed in Patent No. DE-A-31 51019, there is also known a height-adjustment device for a safety belt guide loop in which provision is made for two relatively displaced locking bolts each associated with a respective row of slots, the dimension of each slot in the direction of displacement of the carriage being greater than the corresponding dimension of each locking bolt. The arrangement is such that, in any position of the carriage, at least one of the bolts engages in a slot of the corresponding row. This accordingly ensures that the only uncontrolled displacement of the carriage is a displacement over a maximum distance corresponding to the longitudinal play of the bolt in the slot.

In some preferential positions, the two bolts are engaged so that one bolt is applied against the leading edge of one slot and the other bolt is applied against the trailing edge of the other slot, with the result that there is no longer any play of the carriage in sliding motion along the rail. This device, however, is relatively costly to construct and is subject to a disadvantage in that the action of the two locking bolts is dissymmetrical. In consequence, when one of the bolts is engaged in a slot and is applied on the leading edge of the slot, it produces a tilting torque which is liable to cause a slight pivotal displacement of the carriage and thus to prevent free engagement of the other bolt in the vicinity of the trailing edge of a slot of the other row.

The object of the invention is thus to propose a position-adjusting device for a safety belt guide loop which is more economical to construct and more reliable than the device in accordance with Patent No. DE-A-31 51019.

SUMMARY OF THE INVENTION

In accordance with the invention, the position-adjusting device for a safety belt guide loop comprises a rail provided with retaining slots, a carriage which is slidably mounted on the rail and on which are mounted the guide loop and two locking bolts urged by respective springs to a position of engagement in the rail slots in order to lock the carriage in a corresponding position along the rail. The length of the rail slots in the direction of sliding motion of the carriage is greater than the corresponding dimension of the locking bolts. The bolts are so arranged in relation to each other that, in respect of at least substantially any position of the carriage along the rail, at least one of the locking bolts is located opposite to one of the rail slots and is insertable therein. The slots in which the bolts project in the position of engagement form part of one and the same row of slots which are each capable of receiving both locking bolts, depending on the position of the carriage along the rail.

Significant cost savings are thus achieved since the same rail slots are used for both locking bolts. This even leads to the surprising result that a given number of slots makes it possible to carry out a greater number of stable adjustments. For example, with two successive slots, it is possible to carry out a stable adjustment with both locking bolts in the first slot, a second stable adjustment with both bolts in the second slot and a third stable adjustment with each of the two bolts on each side of the bridge located between the two slots. In addition, both locking bolts cooperate with the same row of rail slots and it is practically no longer possible to have any really troublesome tilting torques. Again owing to the presence of a single row of slots for both locking bolts, the zones of transmission of forces in the rail and in the carriage are reduced and this sets a further limitation on construction costs.

The present invention is also concerned with a safety belt comprising a strap which extends between an inertia reel and an anchoring point via a pillar guide-loop and a buckle, the pillar guide-loop being supported by the carriage of the two-bolt position-adjusting device.

BRIEF DESCRIPTION OF THE DRAWINGS

FIG. 1 is a fragmentary view in perspective of a vehicle in which the safety belt is equipped with a height-adjustment device in accordance with the invention.

FIG. 2 is a view in elevation of the height adjustment device.

FIG. 3 is a fragmentary vertical sectional view of one embodiment of the height-adjustment device in accordance with the invention.

FIG. 4 is a view which is similar to a portion of FIG. 3 but when the two locking bolts are moved back to the position of release.

FIGS. 5 to 7 are views which are similar to FIG. 4 in three other states of the height-adjustment device.

DETAILED DESCRIPTION OF PREFERRED EMBODIMENTS

As shown in FIG. 1, a safety belt of the so-called "three-point" type comprises an abdominal portion 1, a shoulder-belt portion 2 and a portion 3 which returns to an inertia reel 4 secured to the lower end of the center pillar 6 of the vehicle body. The safety belt consists of a single strap, one end of which is secured by means of an anchorage 7 to the vehicle body in the vicinity of the inertia reel 4 which retains the other end of the strap. Between these two ends, the strap passes through a slit of the safety-belt buckle 10 which is located at the junction between the abdominal portion 1 and the shoulder-belt portion 2, and through the slit of a pillar loop 8 which has the function of guiding the strap between the shoulder-belt portion 2 and the return portion 3. The pillar guide-loop 8 is adjustable for height along the pillar 6 by means of a height-adjustment device 9. A pretensioning device 11 associated with the inertia reel 4 is sensitive to any abrupt deceleration of the vehicle in order to produce a downward tractive force on the portion 3. This tractive force is retransmitted to the shoulder-belt portion 2 by means of the pillar guide-loop 8 and to the abdominal portion 1 via the buckle 10. The pretensioning device 11 will thus re-tighten the entire safety belt and consequently apply the seat-occupant's body against the seat-back. To this end, it is necessary to ensure that the pillar guide-loop 8 is efficiently locked in position by the height-adjustment device 9. Failing this precaution, the pretensioning device 11 would not re-tighten the entire safety belt but would tighten only the return portion 3 and would pull the pillar guide-loop 8 downwards, which could even have the effect of slackening the two active portions of the belt, namely the shoulder-belt portion 2 and the abdominal portion 1.

As shown in FIG. 2, the height-adjustment device 9 comprises a rail 12, the bottom portion 39 of which is attached by means of screws 40 to the internal face of the pillar 6. The rail 12 has a single row of retaining slots 13 located at intervals in the longitudinal direction (substantially vertical in service) of the rail 12. Each slot consists of a through-hole formed in the bottom portion 39 and elongated in the longitudinal direction of the rail 12.

The rail 12 has a C-shaped profile formed by the bottom portion 39 as well as two terminal flanges 14 directed towards each other, a carriage 16 being retained between said flanges and guided therebetween in sliding motion along the rail 12. The pillar guide-loop 8 is pivotally supported by the carriage 16 by means of a pin 17 which is screwed in an internally threaded bore 18 (FIG. 3) of a metal core 19 of the carriage 16. The dangerous movement which tends to slacken the safety belt, in particular the shoulder-belt portion 2 and the return portion 3, is directed towards the lower end 12a of the rail 12, namely towards the bottom of the figures.

The carriage 16 carries two locking bolts 22 which are located in spaced relation and aligned in the direction of sliding of the carriage 16 relative to the rail 12.

The two locking bolts 22 are capable of sliding independently of each other in a direction perpendicular to the direction of sliding motion of the carriage, through a respective guide bore 81 of the core 19 of the carriage 16 and in opposition to the action of a respective spring 82 which continuously tends to restore the associated locking bolt 22 to a position of engagement in one of the retaining slots 13 of the rail 12.

In addition, each locking bolt 22 is slidably mounted within a respective bore 83 of a common retractor 84. Each bolt 22 also has an annular flange 86, said flange being adjacent to that face of the retractor 84 which is remote from the core 19. The annular flanges 86, the diameter of which is larger than that of the bores 83 of the retractor 84, are applied against the above-mentioned face of the retractor 84 by the springs 82. Thus the force of the springs 82 is transmitted to the retractor 84 and restores this latter to a rest position in which it is applied against one face of the core 19, namely the face which is remote from the slots 13 of the rail 12. The rest position of the retractor 84 is shown in FIGS. 3 and 6 in which the retractor is held down by both springs 82 and in FIGS. 5 and 7 in which the retractor is held down by only one of the springs 82.

As shown in FIG. 4, the retractor 84 which is slidably mounted within a passageway 87 of a plastic superstructure 38 of the carriage 16 can be moved by hand into an active position of withdrawal of both locking bolts 22 in opposition to the action of the two restoring springs 82. As shown in FIG. 2, the face of the carriage 16 which is directed towards the user is adapted to carry a push-button or small lever 24 for the purpose of actuating the retractor 84.

When the retractor 84 is in the active position, the carriage 16 can be caused to slide freely along the rail 12.

As shown in FIG. 3, the dimension L of each rail slot 13 as measured in a direction parallel to the direction of sliding motion of the carriage 16 is slightly greater than N+2d (relation 1), where: d is the diameter of each locking bolt 22, said bolts being cylindrical and identical; N is the free distance between the two bolts 22 as measured in a direction parallel to the direction of sliding motion of the carriage.

Moreover, as shown in FIG. 6, the dimension N is slightly greater than the dimension h of the bridges 71 between the rail slots 13 as measured in a direction parallel to the direction of sliding motion of the carriage (relation 2).

Thus, when the user releases the retractor 84 and enables the springs 82 to thrust-back the locking bolts 22 towards the rail slots 13, a number of situations are possible:

either the locking bolts 22 are both located opposite to one and the same rail slot 13 as shown in FIG. 3 and as permitted by relation (1), in which case both locking bolts 22 engage in the slot 13, thus arresting the carriage 16 in a well-determined position along the rail 12;

or else each bolt 22 is located respectively opposite to one of two successive rail slots 13 as shown in FIG. 6 and as permitted by relation (2), in which case the two bolts engage in both slots and the carriage 16 is once again arrested in a well-determined position along the rail 12 with a small clearance;

or else, as shown in FIGS. 5 and 7, only one of the locking bolts 22 is located opposite to a rail slot 13 and engages therein under the action of its spring 82 which restores the retractor 84 to the rest position at the same time.

The other locking bolt 22 is applied against a bridge 71 which is adjacent to the rail slot 13 and remains in the withdrawn position in spite of the pressure of its spring 82. This situation is made possible by sliding of the bolt 22 within the corresponding bore 83 of the retractor 84 and withdrawal of the annular flange 86 with respect to the retractor 84.

Taking into account relation (2), in the situation shown in FIG. 5 in which the rear locking bolt 22 (considered with respect to the direction of dangerous movement) has engaged in one of the rail slots 13 whilst the locking bolt 22 is applied on a bridge 71, the play of the rear bolt 22 within its retaining slot 13 permits displacement of the carriage 16 over a sufficient distance to ensure that the front bolt passes beyond the bridge 71 in order to engage in the following rail slot 13, thus resulting in the situation shown in FIG. 6.

To this end, the user can displace the carriage 16 to a slight extent in the downward direction, starting from the situation shown in FIG. 5.

Again starting from FIG. 5, the user can also displace the carriage 16 in the upward direction in order to arrive at the situation shown in FIG. 3 in which the front locking bolt 22 engages in the rail slot 13 in which the rear locking bolt is already located.

When beginning with the situation shown in FIG. 7 in which the front locking bolt has engaged in a rail slot 13 and the rear locking bolt is applied on a bridge 71, a downward movement of the carriage 16 will end in the situation shown in FIG. 3 and an upward movement of the carriage 16 will end in the situation shown in FIG. 6.

Thus in each situation of engagement of a single locking bolt 22, this bolt is capable of limited movement or play within the corresponding rail slot 13 and accordingly permits displacement of the carriage 16 over the full range of sliding motion for which the other bolt is prevented from engaging in the slots 13 by a bridge 71.

Furthermore, taking into account relation (2), at least one locking bolt 22 is always in readiness to engage in a rail slot 13 in any position of the carriage 16.

Under these conditions, the user does not need to take any precaution in order to adjust the carriage 16. In any position in which he places the carriage 16, at least one of the bolts 22 engages in a rail slot 13 and the user can leave the carriage 16 in this state without danger. In fact, in the event of abrupt downward movement of the carriage 16 along the rail 12, the locking bolt 22 which has engaged in a rail slot 13 will rapidly come into abutting contact with the leading edge of the slot 13 and will thus arrest the carriage 16. In this position, the other locking bolt 22 will also engage in another slot 13 or in the same slot 13, depending on whether the initial situation was that of FIG. 5 or that of FIG. 7 respectively.

In practice, the rail 12 can have three retaining slots 13, thus providing five possible adjustments for the carriage 16, three of which correspond to the situation of FIG. 3 and two of which correspond to that of FIG. 6. As a result, the device is particularly economical to construct.

Moreover, the retaining slots 13 are aligned with the fixing screws 40 and any forces required to arrest the carriage 16 are transmitted through the rail 12 in a rational manner with very little deformation. When starting from a situation shown in FIG. 5 or FIG. 7 in which the carriage is abruptly accelerated and then locked in position by the bolt 22 which has already engaged in the rail slot, the carriage is not subjected to any resultant lateral tilting torque which would tend to displace the other locking bolt 22 with respect to the slot in which it is intended to engage.

As will be readily understood, the invention is not limited to the examples described in the foregoing and illustrated in the accompanying drawings.

Moreover, the invention is limited neither to a predetermined type of manual locking nor to any specific form of rail or carriage.

What is claimed is:

1. A position-adjusting device for a safety belt guide loop, comprising a rail having a length and a row of retaining slots, a carriage which is slidably mounted on the rail along the length of the rail and on which are mounted the guide loop, two springs and two locking bolts spaced at an interval form each other and each urged by one of said springs to a position of engagement in the rail slots in order to lock the carriage in a corresponding position along the rail, wherein the rail slots have a length directed along said length of the rail and said length of the rail slots being greater than said interval of the locking bolts, wherein the bolts are so arranged in relation to each other that in respect of at least substantially any position of the carriage along the rail at least one of said locking bolts is located opposite to one of the rail slots and is insertable therein and wherein the slots in which the bolts project in the position of engagement form part of one and the same row of slots which are each capable of receiving both locking bolts depending on the position of the carriage along the rail.

2. A position-adjusting device according to claim 1, wherein the retaining slots are formed through a bottom portion of the rail and wherein the rail is further provided on each side of said bottom portion with flanges for guiding the carriage.

3. A position-adjusting device according to claim 1 wherein, in some positions of the carriage along the rail, both locking bolts are inserted in the same retaining slot at both ends of said slot.

4. A position-adjusting device according to claim 1, wherein bridges between successive retaining slots have a length corresponding to the interval between the two locking bolts and wherein, in some positions of the carriage along the rail, the two locking bolts occupy two successive retaining slots at both ends of a bridge therebetween.

5. A safety belt assembly comprising a strap extending between an inertia reel and an anchoring point via a pillar guide-loop and a buckle, the pillar guide-loop being connected to a position-adjusting device comprising a rail having a length and a row of retaining slots, a carriage slidably mounted on the rail along the length of the rail and on which are mounted the guide loop, two springs and two locking bolts spaced at an interval from each other and each urged by one of said springs to a position of engagement in the rail slots in order to lock the carriage in a corresponding position along the rail, wherein the rail slots have a length directed along said length of the rail and said length of the rail slots being greater than said interval of the locking bolts, wherein said bolts are so arranged in relation to each other that in respect of at least substantially any position of the carriage along the rail at least one of said bolts is located opposite to one of the rail slots and is insertable therein and wherein the slots in which the bolts project in the position of engagement form part of one and the same row of slots which are each capable of receiving both locking bolts depending on the position of the carriage along the rail.

6. A safety belt assembly according to claim 5, comprising in addition a pretensioning device.

7. A safety belt assembly according to claim 5, wherein the retaining slots are formed through a bottom portion of the rail and wherein said rail is further provided on each side of said bottom portion with flanges for guiding the carriage.

8. A safety belt assembly according to claim 5 wherein, in some positions of the carriage along the rail, both locking bolts occupy the same rail slot at both ends of said slot.

9. A safety belt assembly according to claim 5, wherein bridges between successive rail slots have a length corresponding to the interval between the two locking bolts and wherein, in some positions of the carriage along the rail, the two locking bolts occupy two successive rail slots at both ends of a bridge therebetween.

* * * * *